E. G. CHENOWETH AND W. J. TOLLERTON.
REPLACEABLE BEARING FOR BRAKE HANGERS.
APPLICATION FILED MAR. 4, 1918.
1,310,607.
Patented July 22, 1919.
2 SHEETS—SHEET 1.
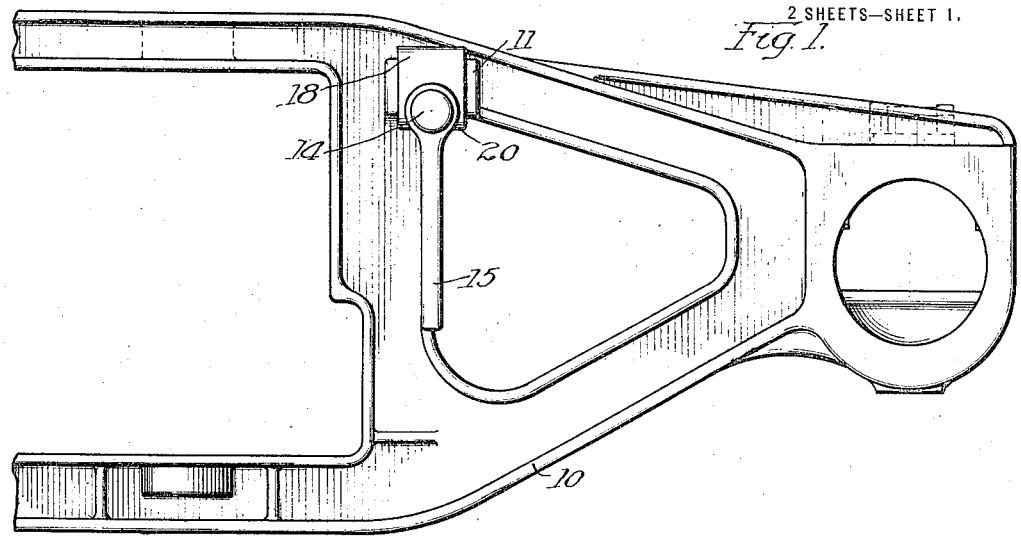
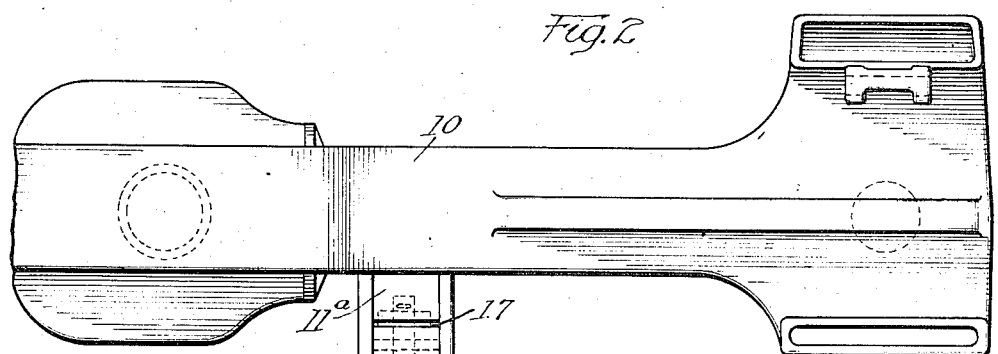
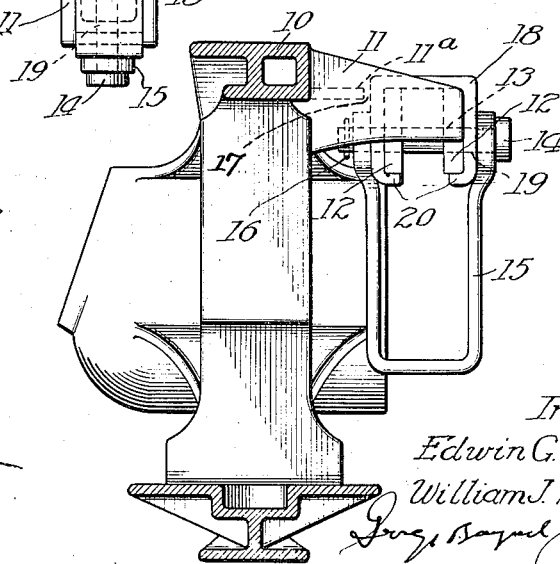
Witnesses.
Inventors.
Edwin G. Chenoweth
William J. Tollerton.
Atty.

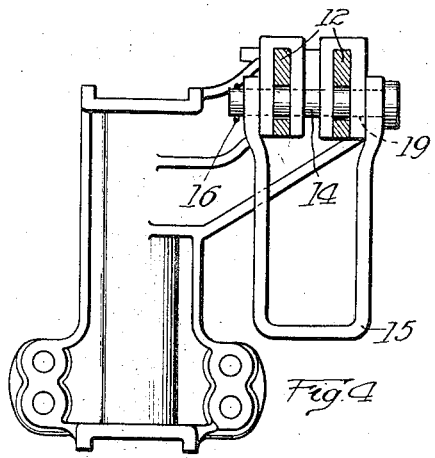
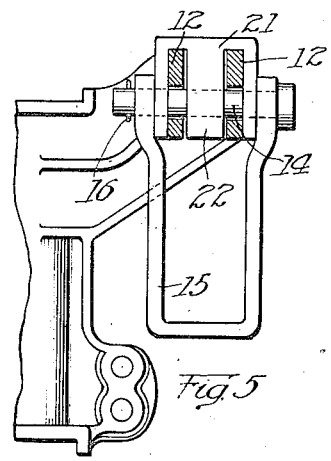
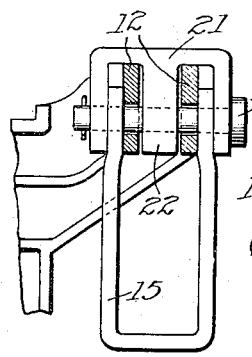
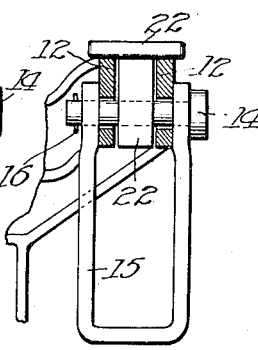
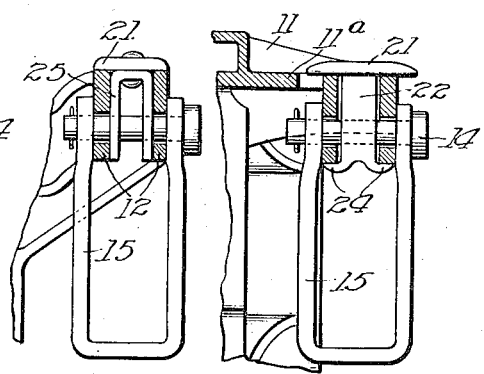
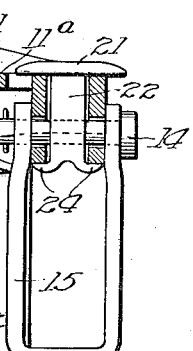
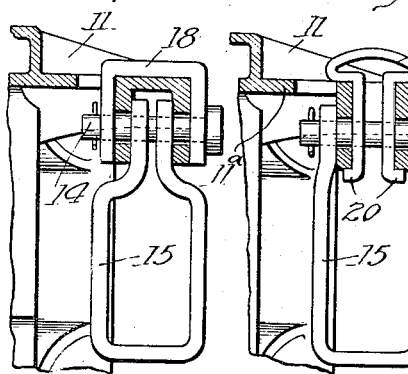
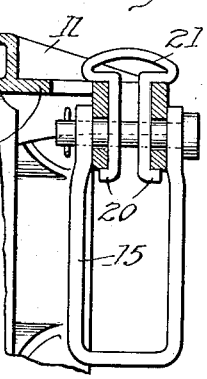
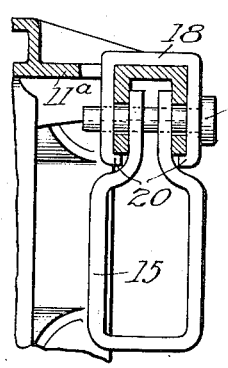
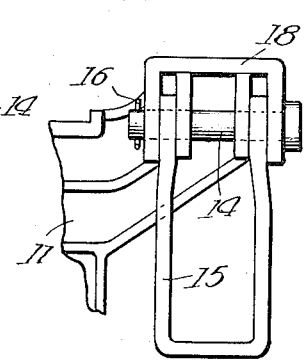

UNITED STATES PATENT OFFICE.

EDWIN G. CHENOWETH AND WILLIAM J. TOLLERTON, OF CHICAGO, ILLINOIS.

REPLACEABLE BEARING FOR BRAKE-HANGERS.

1,310,607. Specification of Letters Patent. Patented July 22, 1919.

Application filed March 4, 1918. Serial No. 220,232.

*To all whom it may concern:*

Be it known that we, EDWIN G. CHENOWETH and WILLIAM J. TOLLERTON, citizens of the United States, residing at Chicago, in the county of Cook and State of Illinois, have invented a certain new and useful Improvement in Replaceable Bearings for Brake-Hangers, of which the following is a full, clear, concise, and exact description.

This invention relates to brake mechanism for railway trucks and more particularly to a new and improved bearing for the brake hangers thereof.

Brake hangers are usually supported either from a casting formed integral with the side frame of the truck or from a casting which is riveted or otherwise secured thereto. In practice, these castings project inwardly from the side frame a sufficient distance to bring them in line with the wheels of the truck, and are provided with a plurality of depending flanges which are drilled to receive a suitable pin from which the brake hanger is supported. These castings are subjected to great strain and jarring each time the brakes of the truck are applied, due to the sharp thrusts transmitted thereto by the hangers when the brakes which are carried at the lower ends thereof are brought to bear against the wheels; the thrusts being upward ones when the wheels are revolving in one direction and downward ones when said wheels are revolving in the reverse direction. It has been found that this sudden and violent jarring caused by a reversal of the load together with the constant vibration of the hanger due to movements of the truck, soon causes the hanger supporting pin, which is mounted in the bearing holes of the depending flanges of the casting, to gradually enlarge and elongate said bearing holes. Furthermore, if this condition is not promptly remedied, the casting becomes materially weakened and should the same be broken, as is sometimes the case, the brake beam supported thereby is very likely to drop onto the track or road-bed immediately in front of the truck and cause serious damage.

The present methods of repairing these castings to remedy the difficulties above pointed out are expensive and involve either the placing of suitable brushings in the worn bearing holes or the use of electric welding. On the other hand, the castings sometimes become so badly worn that it is impractical to repair the same with the methods now used and a discarding of the entire casting is therefore necessitated.

It is the object of the present invention, therefore, to provide the brake hanger casting with means whereby all wear on the bearing holes thereof is eliminated, thus prolonging indefinitely the life of said casting.

Another object of the invention is to provide means whereby these castings, when worn, may be quickly and cheaply repaired, thereby overcoming the disadvantages and difficulties now encountered.

Another object is to provide a new and improved removable and replaceable bearing adapted to fit the depending flanges of the casting and to be supported thereby, said bearing being adapted to receive and support the pin to which the brake hanger is attached, independent of the worn bearings of said casting whereby further wear on said worn bearings is avoided.

A further object of the present invention is the provision of a bearing of the type described which may be quickly and easily applied to any brake hanger casting of standard construction, and one which is simple in construction and economical to manufacture.

Other objects and advantages will be apparent from the following description taken in connection with the accompanying drawings wherein the preferred embodiment of the invention is illustrated and also several modifications thereof.

Figure 1 is a side elevation of a truck side frame, partly broken away, illustrating the application of the improved bearing.

Fig. 2 is a top plan view thereof.

Fig. 3 is a sectional view taken through the side frame and showing the brake hanger casting and bearing in front elevation, and Figs. 4-13 inclusive illustrate modified forms of the invention.

The bearing herein illustrated and described is designed to be applied to brake hanger castings at the time the same are first placed in service thereby eliminating all wear thereon, reinforcing the bearing holes thereof, and increasing the life of said castings; said bearing being also adapted to be applied to used hanger castings in order to prevent further wear thereon, or in order to render useful, castings which have either been removed for repair or discarded as useless.

Referring more in detail to the drawings, the preferred embodiment of the invention is illustrated in Figs. 1, 2 and 3, wherein 10 represents the side frame of a truck. On one face of the side frame 10 near the upper edge thereof, the brake hanger casting 11 is shown, said casting in the type of frame illustrated, being integral therewith. The casting 11 projects inwardly from the frame 10 as shown, so that the end of the same will be in line with the wheels of the truck, and preferably comprises a plurality of depending flanges 12 drilled as at 13 to receive a transverse pin 14, which pin receives the upper end of the brake hanger 15. The head at one end of the pin and the cotter pin 16 at the other end thereof, maintain the hanger against accidental displacement while at the same time, however, said hanger is free to swing back and forth with the movements of the brake beam as the same is moved into and out of operative position. The description thus far embodies nothing more than the ordinary form of truck side frame of the type which is provided with the brake hanger castings as integral parts thereof.

Wear on the bearing holes 13 which are provided in the depending flanges 12 of the casting may be eliminated or reduced to a minimum by means of the bearing 18 which forms the subject matter of the present invention, or in the event said bearing holes have already become worn said bearing 18 may be used to quickly repair and reinforce said casting thereby preventing further wear. This bearing 18 in the form of the invention shown in Figs. 1, 2 and 3 is of substantially inverted U-shape and is provided with suitable bearing holes 19. The bearing is designed to be fitted down over the outside of the depending flanges 12 of the casting, substantially as shown in Fig. 3 of the drawings, one leg of said bearing passing through a suitable opening 17 in the top plate 11ª of the casting, while the other leg thereof fits down over the outside of said casting. When thus positioned, the bearing holes 19 aline substantially with the worn bearing holes 13 of the flanges 12 and are adapted to receive the supporting pin 14. The upper ends of the arms of the brake hanger 15 are then bent slightly so as to offset them outwardly, as shown in Fig. 3, in order that they may readily fit over the outer surfaces of the legs of the bearing 18 and receive the pin 14 on which said hanger is supported in the usual manner. After the bearing 18 has been positioned as just described and the arms of the hanger 15 offset, the parts are assembled in the usual manner. The lower ends 20 of the legs of the bearing 18 are preferably bent inwardly and upwardly against the lower edges of the depending flanges 12 so as to provide means whereby the bearing is securely anchored in position on the casting and whereby upward thrusts encountered by said bearing, as a result of the application of the brakes, may be effectively resisted. Should there be no opening 17 in the top plate 11ª of the brake hanger casting as originally constructed, such an opening may be readily cut therein when it is desired to position the bearing 18 thereon.

In Figs. 4–8 inclusive, and in Fig. 13, brake hanger castings of the type which are adapted to be riveted or otherwise secured to the side frame of the truck are illustrated. In this form of casting the flanges 12 also extend outwardly from the side of the frame and terminate in line with the wheels of the truck, substantially as shown, there being, however, no top plate in this form of casting such as shown in the forms illustrated in Figs 1–3. Accordingly it is not necessary to cut or otherwise alter castings of this type in order that the bearing 18 may be applied thereto. In Fig. 4 of the drawings, the bearing is shown as comprising a plurality of U-shaped members, one for each of the depending flanges 12 of the casting. These members are adapted to fit down over the sides of said flanges and are also provided with suitable bearing holes 19 which are adapted to aline substantially with the bearing holes 13 of the depending flanges. For obvious reasons, in this form of the invention also, it is necessary to offset or spread the upper ends of the arms of the hanger 15 slightly as shown, in order that said hanger may be readily mounted on the supporting pin 14.

In Figs. 5, 6, 7, and 9, the improved bearing 18 is in the form of a forging or casting provided with a cap or head 21 adapted to rest upon the upper edges of the depending flanges 12 to thereby support the bearing in operative position. In Figs. 5 and 6 the forging or casting, in addition to being provided with the depending legs which fit down over the outside of the flanges 12, is also provided with a bearing member 22 which fits between the depending flanges 12, the pin 14 being supported by said member 22 as well as by the outer legs of the bearing. In this manner, a three-point suspension for the bolt 14 is provided. In Figs. 7 and 9, the member 22 provides the only bearing support for the pin 14, the outer legs shown in the other figures being dispensed with. The member 22 in Fig. 9 is provided with suitable lugs 24 which are adapted to be bent outwardly and upwardly against the lower edges of the depending flanges 12 after the bearing has been positioned substantially as shown. In this manner the upward thrusts transmitted to the bearing through the hanger 15, when the brakes of the truck are applied, are resisted.

In Fig. 8 the invention is in the form of a bearing provided with a suitable head or cap 21 which is adapted to rest down upon the upper edges of the depending flanges 12, said head or cap 21 having riveted or otherwise securely attached thereto a U-shaped member 25 which depends from said head or cap 21 downwardly between the flanges 12. In this manner, it will be noted that a two-point bearing suspension is provided for the pin 14 between the depending flanges 12. The outer legs of the bearing are also dispensed with in this form of the invention.

In Figs. 10 and 12, the bearing 18 is in the same form as the bearing illustrated in Figs. 1–3 inclusive with the exception that in Fig. 10 the lower ends of the lugs of the bearing are not bent inwardly against the lower edges of the depending flanges 12, these Figs. 10 and 12 being included in order to illustrate a slightly different method of attaching the hanger 15, the upper ends of said hanger being offset inwardly rather than outwardly and attached to the pin 14 between the depending flanges 12 instead of on the outside of said flanges.

In Fig. 11, the bearing 18 is bent to form a suitable head 21 and legs which depend therefrom between the depending flanges 12, the lower ends of said legs being bent outwardly and upwardly against the lower edges of said depending flanges so as to resist the upward thrusts of the hanger 15, as previously described. It will be noted that in Figs. 7, 8, 9 and 11, there is no necessity for altering the hanger 15 in view of the fact that the removable bearing 18 is provided with a bearing or bearing surfaces which are positioned between the depending flanges 12, whereas in Figs. 6 and 13 no change in the hanger is necessary by reason of the fact that the upper ends thereof fit between the legs of the bearing 18 and the sides of the flanges 12.

While the bearing herein illustrated and described is designed primarily for use in connection with railway truck brake hanger castings, it may also be used in connection with spring hangers, spring plank hangers, bolster hangers, etc. In other words, said bearing is of more or less general application and it is not, therefore, desired to limit the same to the particular forms or application shown except where limitations appear in the appended claims, the embodiments of the invention herein illustrated having been selected merely for the purpose of conveying a clear and comprehensive understanding of the scope and novel features thereof.

Having thus described our invention, what we claim as new and desire to secure by Letters Patent of the United States is:—

1. A replaceable bearing for brake hangers comprising a supporting element adapted to engage the brake hanger casting of a railway truck side frame, and an apertured member depending from said supporting element and adapted to receive and support the hanger pivot pin.

2. The combination with a brake hanger supporting casting having depending flanges, of a removable bearing adapted to fit over said flanges and to receive the hanger pivot pin.

3. A removable bearing for a brake hanger of the type described, comprising a head or supporting member, a depending leg having a hole therein for the reception of the hanger pivot pin, and means for resisting the upward thrusts of said hanger.

4. A replaceable bearing for railway brake hangers, comprising a head adapted to engage the brake hanger support and means carried by said head adapted to receive and support the hanger pivot pin.

5. The combination with the brake hanger supporting flanges of a railway truck, of a removable bearing adapted to fit said flanges and to receive and support the pivot pin on which the brake hanger is mounted.

6. A removable bearing for brake hangers comprising a head or supporting member and a plurality of legs depending therefrom and adapted to fit down over the sides of the depending flanges of the brake hanger casting, the ends of said legs being bent under the lower edges of said flanges whereby said bearing may resist upward thrusts of the hanger.

7. The combination with a brake hanger supporting casting having depending flanges with bearings therein to receive the hanger pivot pin, of a removable bearing for said pivot pin adapted to fit over said flanges and to be supported thereby, and means whereby said bearing is anchored against movements in a vertical direction.

8. A bearing for brake hangers adapted to be applied to the supporting casting carried by the side frame of a truck when the bearings of said casting have become worn, comprising a U-shaped member adapted to fit over the depending flanges of said casting and to be supported thereby, the legs of said U-shaped member being provided with bearings for the reception of the hanger pivot pin.

9. A bearing for brake hangers adapted to be applied to the supporting casting carried by the side frame of a truck when the bearings of said casting have become worn, comprising a U-shaped member adapted to fit over the depending flanges of said casting and to be supported thereby, the legs of said U-shaped member being provided with bearings for the reception of the hanger pivot pin, and means adapted to resist upward thrusts of the hanger.

10. The combination with a railway truck side frame having a brake hanger support, said support being provided with a bearing adapted to receive the hanger pivot pin, of a second bearing for said pivot pin positioned adjacent said first-named bearing and in substantial alinement therewith, said second bearing being provided with a supporting element adapted to engage said support.

11. The combination with a railway truck side frame having a brake hanger support, said support being provided with a bearing adapted to receive the hanger pivot pin, of a second bearing for said pivot pin positioned adjacent said first-named bearing and in substantial alinement therewith, said second bearing being provided with a supporting element adapted to engage said support, and means carried by said second bearing for resisting the upward thrusts of the hanger.

12. The combination with a brake hanger supporting casting having apertured flanges for receiving and supporting the hanger pivot pin, of a reinforcing bearing for said pivot pin positioned adjacent one of said flanges, and means carried by said bearing for supporting the same in substantial alinement with the apertures in said flanges.

13. The combination with a brake hanger supporting casting having apertured flanges for receiving and supporting the hanger pivot pin, of a reinforcing bearing for said pivot pin positioned adjacent one of said flanges, means carried by said bearing for supporting the same in substantial alinement with the apertures in said flanges, and means also carried by said bearing for maintaining the same against vertical displacement.

14. The combination with a brake hanger supporting casting having apertured flanges for receiving and supporting the hanger pivot pin, of a reinforcing bearing for said pivot pin positioned adjacent one of said flanges, and means carried by said bearing and adapted to engage the top of one of said flanges for supporting said bearing in substantial alinement with the aperture therein.

15. The combination with a railway truck side frame having a plurality of bearing members for supporting a brake hanger, of a reinforcing bearing member for said first-named members adapted to be supported in proper position relatively to said first-named members by engagement therewith.

16. The combination with a railway truck side frame having brake hanger supporting flanges, of a bearing member adapted to embrace said flanges and to receive and support the hanger pivot pin.

17. The combination with a railway truck side frame having brake hanger supporting flanges, of means adapted to engage the top of one of said flanges and being provided with a depending member adapted to receive and support the brake hanger pivot pin.

In witness whereof we herenuto subscribe our names this 28th day of February A. D., 1918.

EDWIN G. CHENOWETH,
WILLIAM J. TOLLERTON.